United States Patent
Heinouchi

[11] Patent Number: 5,913,244
[45] Date of Patent: Jun. 15, 1999

[54] VIBRATOR

[75] Inventor: Yoshiaki Heinouchi, Joyo, Japan

[73] Assignee: Murata Manufacturing Co., Ltd., Japan

[21] Appl. No.: 08/804,927

[22] Filed: Feb. 24, 1997

[30]  Foreign Application Priority Data

Feb. 22, 1996 [JP] Japan .................................. 8-061947

[51] Int. Cl.⁶ ................................................ G01P 15/09
[52] U.S. Cl. ...................... 73/662; 73/514.36; 73/504.14
[58] Field of Search ........................... 73/504.04, 504.12, 73/504.14, 504.15, 504.16, 514.21, 514.29, 514.34, 514.36, 493, 662

[56]  References Cited

U.S. PATENT DOCUMENTS

| | | | |
|---|---|---|---|
| 4,525,081 | 6/1985 | Myhre | 374/208 |
| 4,628,734 | 12/1986 | Watson | 73/504.16 |
| 5,053,671 | 10/1991 | Kobayashi et al. | 310/329 |
| 5,581,032 | 12/1996 | Uemura et al. | 73/493 |
| 5,681,994 | 10/1997 | Nakamura et al. | 73/514.34 |

FOREIGN PATENT DOCUMENTS

| | | |
|---|---|---|
| 626212 | 11/1994 | European Pat. Off. . |
| 707212 | 4/1996 | European Pat. Off. . |

*Primary Examiner*—Hezron Williams
*Assistant Examiner*—Rose M. Miller
*Attorney, Agent, or Firm*—Ostrolenk, Faber, Gerb & Soffen, LLP

[57]  ABSTRACT

A vibrator includes a vibrating member, and piezoelectric devices formed on both surfaces thereof. Supporting portions are formed at one end of the vibrating member with connecting portions provided therebetween. A weight is mounted to the other end of the vibrating member with other connecting portions provided therebetween. The supporting portions are fixed to a holding member having a concave portion. The hardness of the holding member is set lower than the hardness of the vibrating member. As the material for the holding member, it is preferable to use a vibration-absorbing material for efficiently absorbing vibrations leaking from the vibrating member.

5 Claims, 5 Drawing Sheets

VIBRATOR

BACKGROUND OF THE INVENTION

1. Field of the Invention

The present invention relates to vibrators, and in particular to vibrators used as acceleration sensors and so forth for measuring acceleration in car navigation systems.

2. Description of the Related Art

FIG. 4 is a perspective view illustrating one example of a conventional vibrator. FIG. 5 is a side view illustrating a side of the vibrator. The vibrator 1 includes, for example, a rectangular, plate-shaped vibrating member 2. A supporting member 3 is formed at one end of the vibrating member 2 along the longitudinal direction. The supporting member 3 is connected to the end of the vibrating member 2 and a node portion along the longitudinal direction by thin connecting portions 3a. The supporting member 3 is mounted on a base or the like by using a technique such as soldering. In this arrangement the base and the vibrating member 2 need to be spaced from one another so that the base cannot hinder vibrations from the vibrating member 2. Accordingly, the supporting member 3 is formed to be bent.

Also, a weight 4 is mounted on the other end of the vibrating member 3. The weight 4 is connected to the other end of the vibrating member 2 and the node portion along the longitudinal direction by the other connecting portions 5. The vibrating member 2, the supporting member 3, the connecting portions 3a, the other connecting portions 5 and so forth are formed by punching a permanent elastic metallic material, such as elinver, in a predetermined shape and by bending the punched material.

Piezoelectric devices 6a, 6b and piezoelectric devices 6c, 6d are formed on both surfaces of the vibrating member 2 along the longitudinal direction. The piezoelectric devices 6a and 6b are oppositely formed on the vibrating member 2 in the central longitudinal direction to the end, while the piezoelectric devices 6c and 6d are oppositely formed on the vibrating member 2 along the central longitudinal direction with respect to the other end. The piezoelectric devices 6a, 6b and the piezoelectric devices 6c, 6d include piezoelectric layers, respectively, and electrodes are formed on both surfaces of each piezoelectric layer. One of the electrodes is bonded to the vibrating member 2. The piezoelectric devices 6a, 6b and the piezoelectric devices 6c, 6d are oppositely polarized. For example, when the piezoelectric layers of the piezoelectric devices 6a and 6b are polarized from the exterior to the vibrating member 2, the piezoelectric devices 6c and 6d are polarized from the vibrating member 2 to the exterior.

The vibrator 1 is used as, for example, an acceleration sensor. In this case the piezoelectric devices 6a, 6b and the piezoelectric devices 6c, 6d are supplied with a driving signal in phase and at the same level. Since the piezoelectric devices 6a, 6b and the piezoelectric devices 6c, 6d are oppositely polarized, both pairs are oppositely vibrated by being supplied with the same driving signal. Consequently, the vibrating member 2 has longitudinal vibrations in mutually opposite directions, putting a boundary at its center. In other words, as shown by solid line arrows in FIG. 5, when a portion of the vibrating member 2 on which the piezoelectric devices 6a and 6b are formed lengthens, a portion of the vibrating member 2 on which the piezoelectric devices 6c and 6d are formed shortens. In reverse, as shown by dashed line arrows, when the portion of the vibrating member 2 on which the piezoelectric devices 6a and 6b are formed shortens, the portion of the vibrating member 2 on which the piezoelectric devices 6c and 6d are formed lengthens. Accordingly, when observed from both ends of the vibrating member 2, a portion of the vibrating member 2, having approximately ¼ of the overall length, becomes a node. In addition, the vibrating member 2 has longitudinal vibrations in mutually opposite directions on both sides of the central portion, thus, also when the vibrating member 2 longitudinally vibrates, its overall length does not change.

When acceleration is perpendicularly applied onto the vibrating member 2 in the longitudinal vibration mode, the vibrating member 2 warps. Then, the weight 4 increases warping of the vibrating member 2. The warp of the vibrating member 2 causes the piezoelectric devices 6a, 6b, 6c and 6d to output signals in accordance with the warp. Consequently, by measuring the output signals from the piezoelectric devices 6a, 6b, 6c and 6d, the acceleration can be detected.

The above-described vibrator has the connection portions formed at one end of the vibrating member and in the vicinity of the node portion, which decreases vibrations leaking from the vibrating member. However, in order to increase warping caused by acceleration, the vibrating member is preferably thin, but a process such as bending causes deformation of the vibrating member. In addition, when the supporting member is soldered to the base, the heat affects the piezoelectric devices and their bonded portions, so that an ideal condition cannot be maintained. As a result, vibrations from the vibrating member leak to the base. When leaking vibrations are conducted back to the vibrating member through the supporting member, vibrations from the vibrating member are affected to cause an increase in temperature drift.

SUMMARY OF THE INVENTION

Accordingly, it is an object of the present invention to provide a vibrator in which temperature drift is reduced.

To this end, according to the present invention, the foregoing object is achieved through the provision of a vibrator including a plate-shaped vibrating member and a holding member for holding the vibrating member, the holding member having a hardness lower than the hardness of the vibrating member.

Preferably, the holding member comprises a vibration-absorbing material.

The vibrator may further include piezoelectric devices formed on both surfaces of the vibrating member.

By reducing the hardness of the holding member lower than that of the vibrating member, leaking vibrations from the vibrating member are absorbed by the holding member. In particular, by forming the holding member with a vibration-absorbing material, the absorbing effect can be increased. In addition, by forming the piezoelectric devices on both surfaces of the vibrating member and by supplying the devices with a driving signal, the vibrating member can be vibrated.

Also, by separately forming the vibrating member and the holding member, a process such as bending can be omitted, which can prevent deformation in such a process. When the vibrator is assembled, the vibrating member can be mounted on the holding member after the holding member is soldered to the base. Accordingly, heat generated by soldering the holding member to the base is not conducted to the vibrating member, so the piezoelectric devices and the bonded portions are not affected by the heat.

According to the present invention, vibrations from the vibrating member are absorbed by the holding member, thus, it is possible to prevent the vibration from leaking to the base on which the holding member is mounted. Consequently, leaking vibrations can be prevented from being conducted back to the vibrating member, and vibrations from the vibrating member can be maintained in normal conditions. In addition, the vibrating member is not affected by the heat generated when the holding member is mounted on the base, and deformation of the vibrating member when it is processed can be reduced. Accordingly, leaking vibrations themselves from the vibrating member can be reduced. Based on these characteristics, when the vibrator is used as an acceleration sensor or the like, temperature drift can be reduced, and other characteristics can be stabilized. Reducing deformation of the vibrating member when it is processed increases a degree of freedom concerning the shape and material of the vibrating member, which can realize a reduction in the size of the vibrator, the improvement of working efficiency, and so forth.

The foregoing object, other objects, features and advantages of the present invention will be apparent from the following detailed description of an embodiment thereof which refers to the attached drawings.

DESCRIPTION OF THE PREFERRED EMBODIMENT

Figure 1:
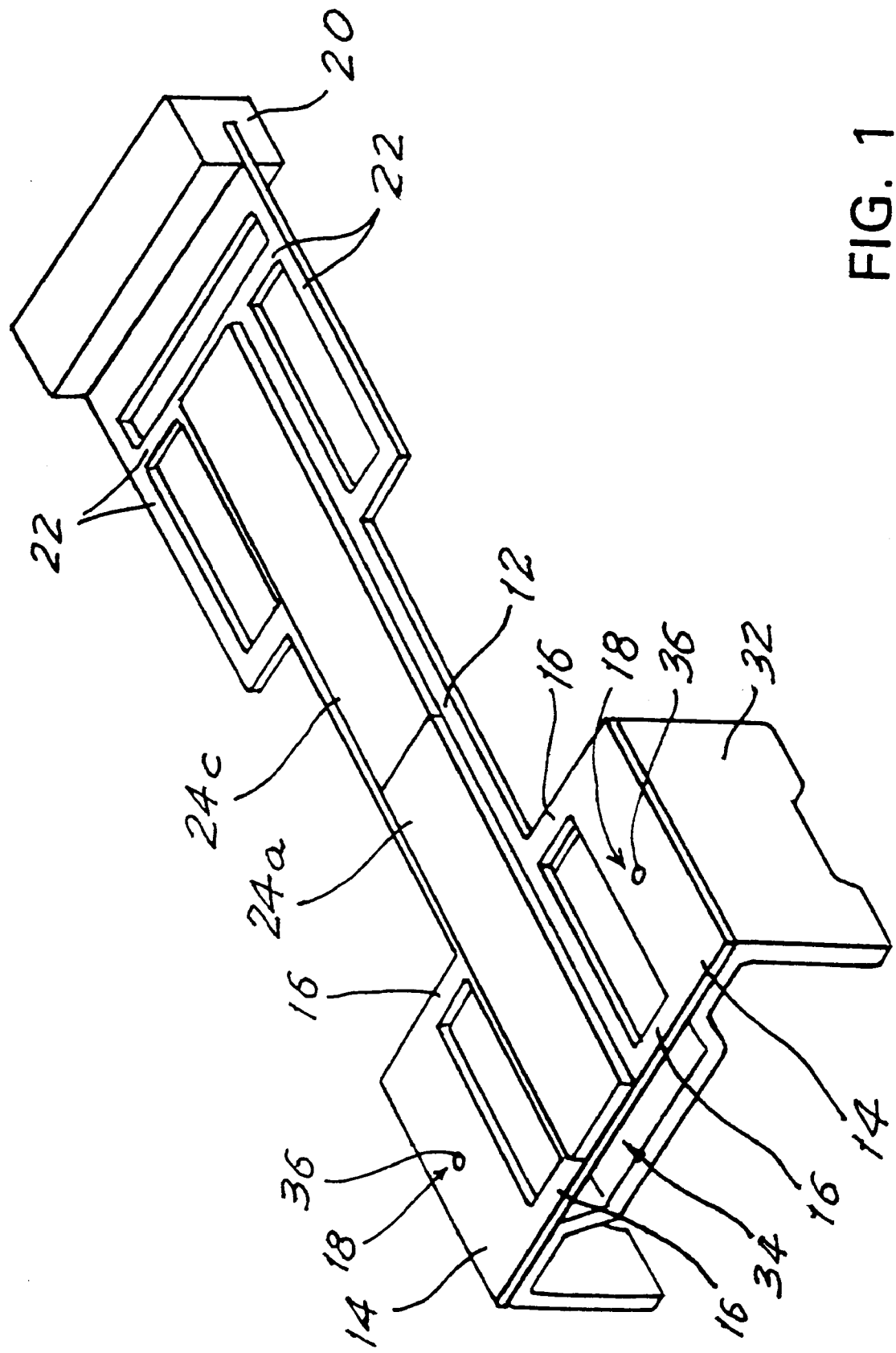
FIG. 1 is a perspective vie illustrating a vibrator according to an embodiment of the present invention.
Figure 2:
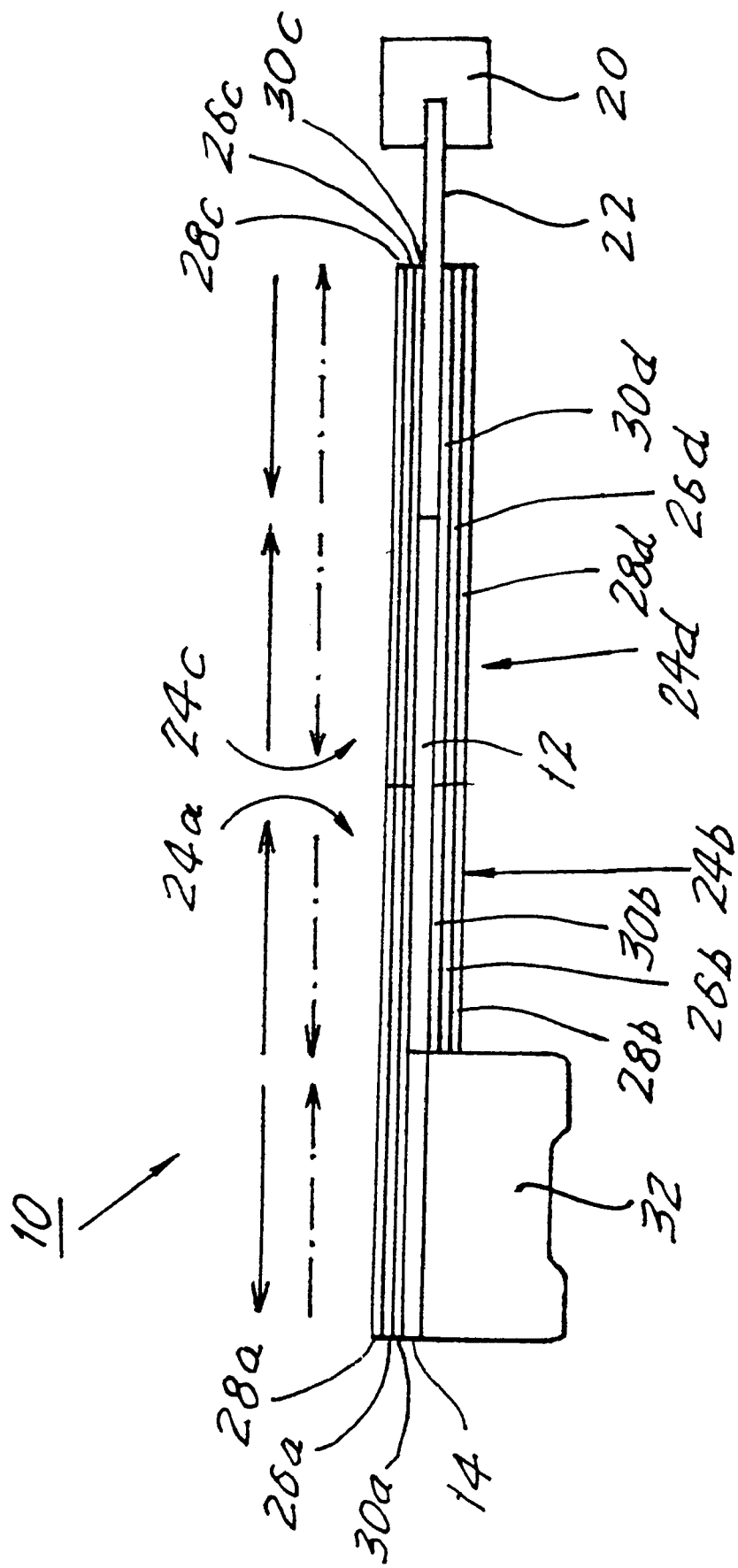
FIG. 2 is a side view illustrating the vibrator shown in FIG. 1.
Figure 3:
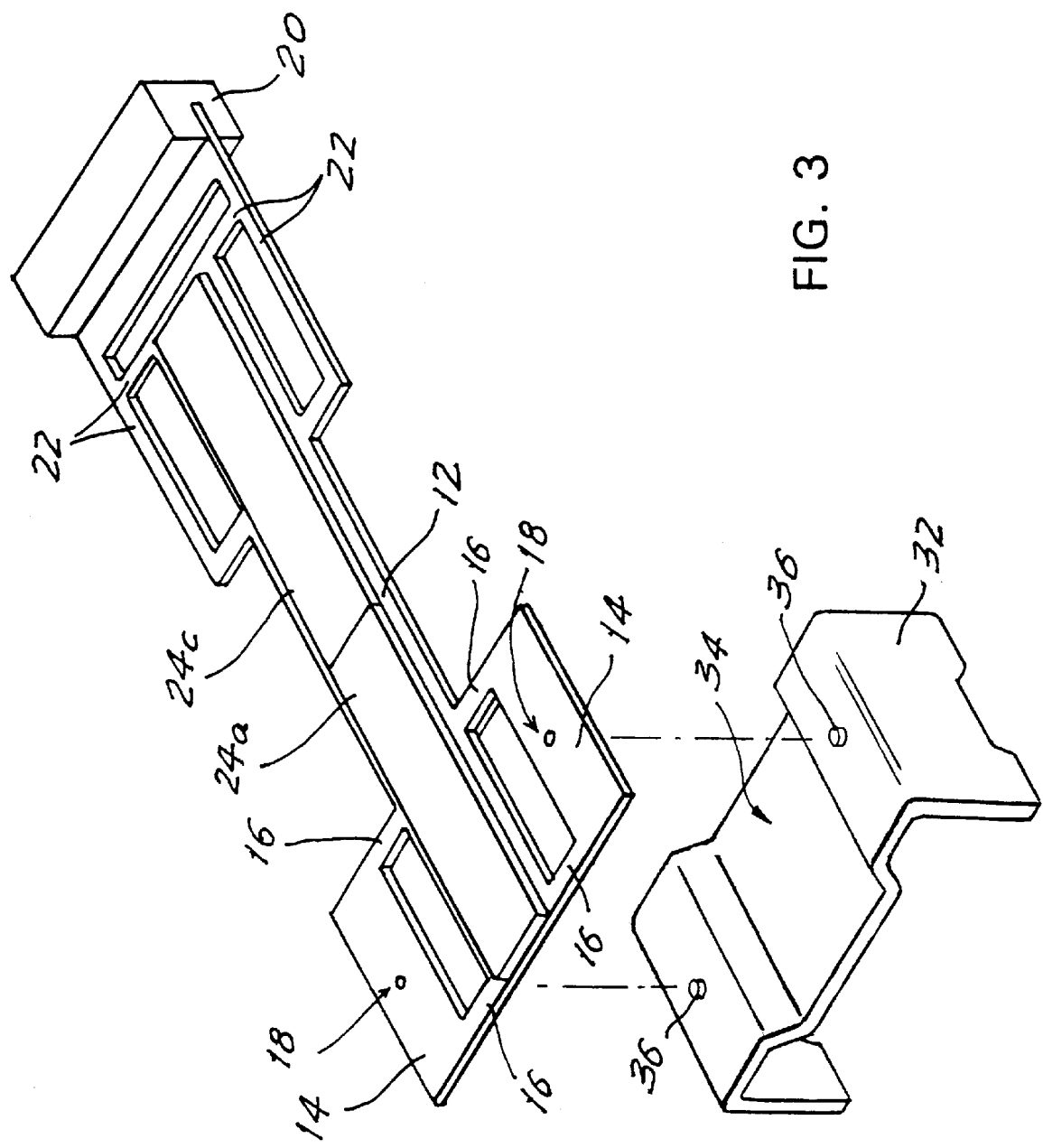
FIG. 3 is an exploded, perspective view illustrating the vibrator shown in FIG. 1.
Figure 4:
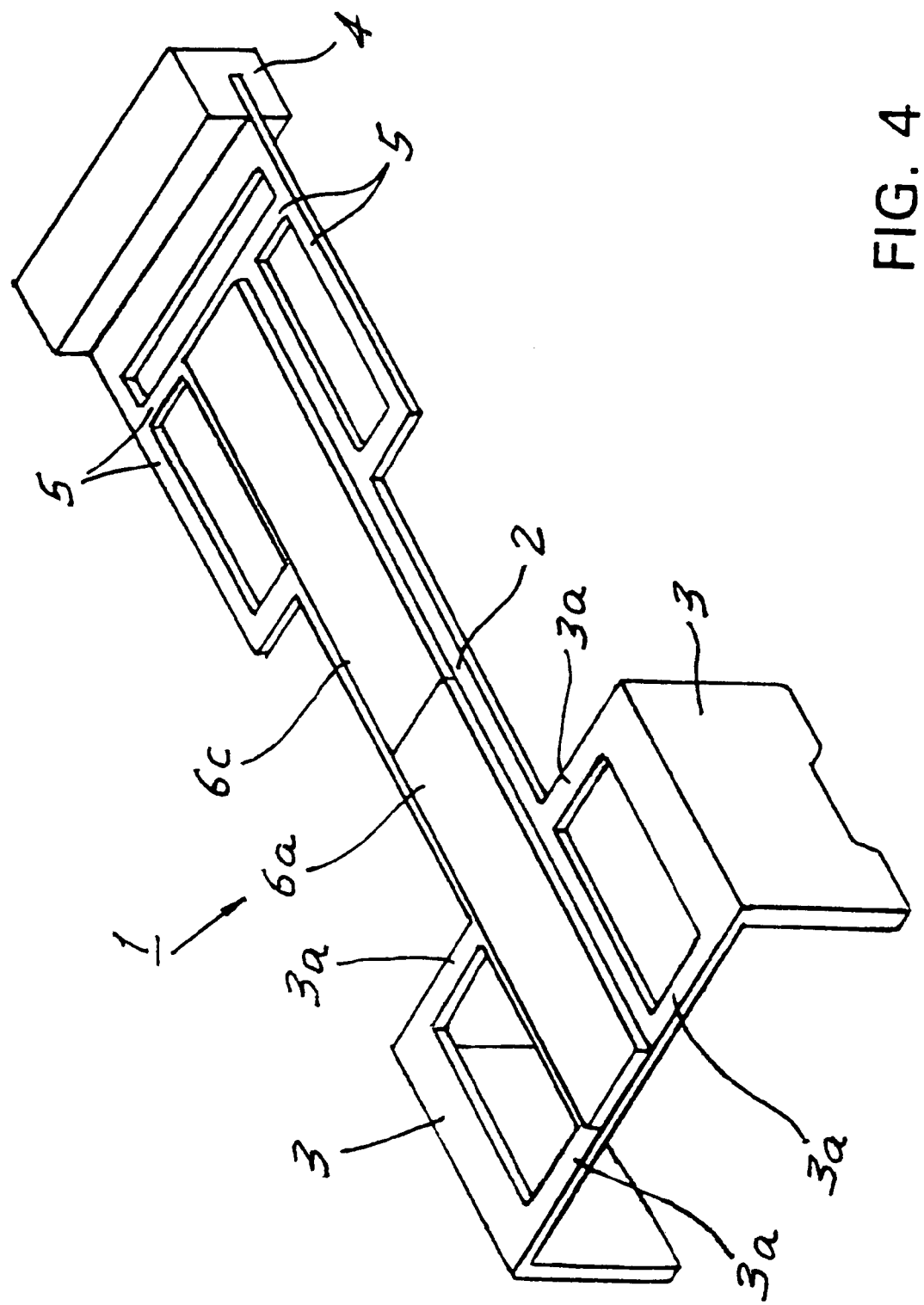
FIG. 4 is a perspective view illustrating an example of a conventional vibrator.
Figure 5:
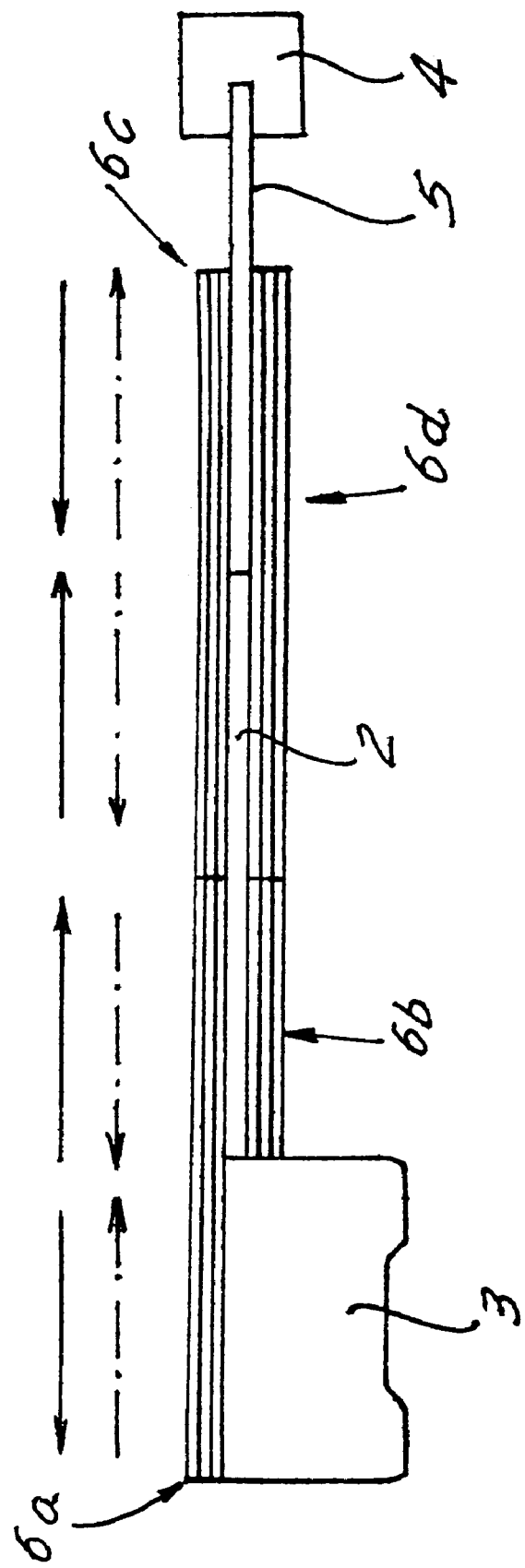
FIG. 5 is a side view illustrating the conventional vibrator shown in FIG. 4.

FIG. 1 is a perspective view illustrating a vibrator according to an embodiment of the present invention. FIG. 2 is a side view of the vibrator. FIG. 3 is an exploded perspective view of the vibrator. The vibrator 10 includes, for example, a rectangular, plate-shaped vibrating member 12. At one end of the vibrating member 12 along the longitudinal direction, supporting portions 14 are formed on both sides of the vibrating member 12 along the axial direction. The supporting portions 14 are connected to the vibrating member 12 by thin connecting portions 16. The connecting portions 16 are formed at one end of the vibrating member 12 and at a portion of the vibrating member 12, positioned approximately ¼ of the overall length of the vibrating member 12 from one end. The vibrating member 12, the supporting portions 14 and the connecting portions 16 are formed on the same plane. Holes 18 are formed in the supporting portions 14.

Also, a weight 20 is mounted on the other end of the vibrating member 12 along the longitudinal direction. The weight 20 is connected to the vibrating member 12 by other connecting portions 22. The connecting portions 22 are formed at the other end of the vibrating member 12 and at a portion of the vibrating member 12, positioned approximately ¼ of the overall length of the vibrating member 12 from the other end. The vibrating member 12 and the connecting portions 22 are formed on the same plane. The weight 20 is mounted on the vibrating member 12 by the connecting portions 22. The vibrating member 12, the supporting portions 14 and the connecting portions 16 and 22 are formed from, for example, a permanent elastic material such as an iron-nickel alloy or elinvar.

A plurality of piezoelectric devices 24a, 24b, 24c and 24d are formed on both surfaces of the vibrating member 12. The piezoelectric devices 24a and 24b are oppositely formed on the vibrating member 12 with respect to one end along the central longitudinal direction. The piezoelectric devices 24c and 24d are oppositely formed on the vibrating member 12 with respect to the other end along the central longitudinal direction.

The piezoelectric device 24a includes a piezoelectric layer 26a. Electrodes 28a and 30a are formed on both surfaces of the piezoelectric layer 26a. One electrode 30a is bonded to the vibrating member 12. Similarly, the piezoelectric devices 24b, 24c and 24d include piezoelectric layers 26b, 26c and 26d, respectively. Electrodes 28b, 30b, electrodes 28c, 30c and electrodes 28d, 30d are formed on both surfaces of the piezoelectric layers 26b, 26c and 26d. The electrodes 30b, 30c and 30d on one surface are bonded to the vibrating member 12.

In the vibrator 10, the piezoelectric layers 26a, 26b of the piezoelectric devices 24a, 24b and the piezoelectric layers 26c, 26d of the piezoelectric devices 24c, 24d are oppositely polarized mutually. For example, when the piezoelectric layers 26a, 26b are polarized from the exterior to the vibrating member 12, the piezoelectric layers 26c, 26d are polarized from the vibrating member 12 to the exterior.

The vibrating member 12 is held by a holding member 32. The holding member 32 is comprised of, for example, a vibration-absorbing material such as Cr/Fe. The holding member 32 is formed having a U-shaped cross section with corners, and with a concave portion 34 at a central portion of the holding member 32. Projections 36 are formed at the positions corresponding to the holes 18 formed on the supporting portions 14. The vibrating member 12 is mounted on the holding member 32.

When the vibrator 10 is assembled, the holding member 32 is mounted to the base by, for example, soldering. The vibrating member 12 is disposed on the holding member 32, and the supporting portions 14 and the holding member 32 are connected. Then the projections 36 on the holding member 32 are inserted into the holes 18 of the supporting portions 14. The vibrating member 12 and the connecting portions 16 are disposed above the concave portion 34 of the holding member 32. This arrangement is to avoid hindering vibrations of the vibrating member 12. In order to unite the supporting portions 14 and the holding member 32, a method which enables instant connection, such as welding or connection by laser, is used.

The vibrator 10 is used as, for example, an acceleration sensor. In this case the piezoelectric devices 24a, 24b, 24c and 24d are supplied with a driving signal in the same phase and at the same level. Since the piezoelectric layers 26a, 26b of the piezoelectric devices 24a, 24b and the piezoelectric layers 26c, 26d of the piezoelectric devices 24c, 24d are oppositely polarized, the piezoelectric devices 24a, 24b and the piezoelectric devices 24c, 24d oppositely vibrate. The piezoelectric devices 24a, 26b are oppositely formed on the vibrating member 12, thus, when they vibrate under the same conditions, a portion of the vibrating member 12 longitudinally vibrates. Similarly, also the portion in which the piezoelectric devices 24c, 24d are formed longitudinally vibrates.

Since the piezoelectric devices 24a, 24b and the piezoelectric devices 24c, 24d oppositely vibrate, the vibrating member 12 has mutual opposite, longitudinal vibration on both sides along the central longitudinal direction. In other words, as shown by solid line arrows in FIG. 2, when one portion of the vibrating member 12 in the center lengthens, another portion shortens. In reverse, as shown by dashed line arrows in FIG. 2, when one portion of the vibrating member 12 in the center shortens, another portion lengthens. Consequently, when observed from both ends of the vibrating member 12, a portion approximately ¼ of the overall length of the vibrating member 12 becomes a node. In addition, the vibrating member 2 has longitudinal vibrations in opposite directions on both sides of the central portion, thus, also when the vibrating member 2 longitudinally vibrates, the overall length does not change.

In this condition, when acceleration is perpendicularly applied onto the vibrating member 12, the vibrating member 12 warps. Then, the weight 20 increases warping of the vibrating member 12. The warp of the vibrating member 12 causes warping of the piezoelectric devices 24a to 24d, and in accordance with the warp, the piezoelectric devices 24a to 24d output signals. Consequently, by measuring the output signals from the piezoelectric devices 24a to 24d, the acceleration can be detected.

For measurement, for example, the difference between output signals from the piezoelectric devices 24c, 24d can be measured. Warping of the vibrating member 12 by acceleration causes the opposite piezoelectric devices 24c, 24d to warp in the reverse direction, thus, signals outputted from the piezoelectric devices are inverted. Consequently, by measuring the difference between output signals from the piezoelectric devices 24c, 24d, a large output with respect to the acceleration is obtained to provide a highly sensitive acceleration sensor. Concerning types of signals to be measured, for example, voltage difference can be measured. Otherwise, frequency difference or phase difference between the output signals may be measured, or the impedance difference of the impedances of the piezoelectric devices 24c, 24d may be measured. Of course, output signals from the piezoelectric devices 24a, 24b may be measured, or acceleration may be measured from changes in the output signals from each piezoelectric device. In such a manner, by forming the vibrating member 12 to longitudinally vibrate, a dead zone close to zero acceleration can be eliminated to enable detection of minute accelerations.

According to the vibrator 10, the connecting portions 16, 22 are formed at the ends of the vibrating member 12 and in proximity to the node, and this arrangement reduces vibration leakage from the vibrating member 12. In addition, the holding member 32 is comprised of the vibration-absorbing material, thus, leaking of vibrations from the vibrating member 12 are absorbed by the holding member 32, so the vibrations do not leak to the base. Accordingly, the vibrations leaking to the base are not conducted back to the vibrating member 12, which can maintain normal vibration of the vibrating member 12.

In addition, the vibrating member 12 and the holding member 32 are separately formed, thus, the vibrating member 12 can be mounted on the holding member 32 after the holding member 32 is mounted on the base. Consequently, when the holding member 32 is soldered to the base, the heat does not affect the piezoelectric devices 24a to 24d. Concerning a method for connecting the holding member 32 and the vibrating member 12, by inserting the projections 36 of the holding member 32 into the holes 18 of the connecting portions 16 and instantly bonding them by welding or a laser, it is possible to prevent the heat from affecting the bonded portions of the piezoelectric devices 24a to 24d and the vibrating member 12.

Also, the separate formation of the vibrating member 12 and the holding member 32 eliminates a process which bends the vibrating member 12, and can reduce deformation of the vibrating member 12 during processing. Accordingly, compared to the conventional vibrator, leaking vibrations themselves from the vibrating member 12 can be reduced. Based on the features mentioned, according to the vibrator 10 used as an acceleration sensor, temperature drift can be reduced, and characteristics can be stabilized. In addition, less distortional influence in processing the vibrating member 12 increases a degree of freedom in selecting the shape and material of the vibrating member 12, which can reduce the size of the vibrator and improve working efficiency.

Concerning the material for the holding member 32, by using a material which has a different hardness or Young's modulus compared with the vibrating member 12, such as soft iron, copper alloy and so forth, a vibration-absorbing effect can be obtained and temperature drift can be reduced.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibrator, comprising:
    an elongated, plate-shaped vibrating member having longitudinally spaced, opposed ends and top and bottom surfaces;
    supporting portions at a first end of said opposed ends connected to said first end by first connecting portions;
    a weight;
    second connecting portions for connecting said weight to the other of said opposed ends;
    a plurality of piezoelectric elements on said top and bottom surfaces of said vibrating member for vibrating said vibrating member in the longitudinal direction thereof; and
    a holding member structured and arranged to hold said supporting portions, said holding member having a hardness lower than the hardness of said vibrating member, said first connecting portions and said supporting portions serving as buffers so that said holding member does not attenuate vibration of said vibrating member directly.

2. A vibrator according to claim 1, wherein said holding member is made of a vibration-absorbing material to absorb leaking vibration from said vibrating member.

3. A vibrator, comprising:
    an elongated, plate-shaped vibrating member having longitudinally spaced, opposed ends and top and bottom surfaces;
    supporting portions at a first end of said opposed ends connected to said first end by first connecting portions;
    a weight;
    second connecting portions for connecting said weight to the other of said opposed ends;
    a plurality of piezoelectric elements on said top and bottom surfaces of said vibrating member for vibrating said vibrating member in the longitudinal direction thereof; and
    a holding member structured and arranged to hold said supporting portions, said holding member having a hardness lower than the hardness of said vibrating member;

wherein said vibrating member, said supporting portions and said first connecting portions are in a first plane and said holding member has first elements connected to said first connecting portions in substantially the same plane thereof and a second element spaced from said vibrating member and disposed in a second plane spaced from and parallel to said first plane.

4. A vibrator according to claim 3, wherein said holding member has mounting legs extending from said first elements to enable mounting of said vibrator in spaced relationship to a base.

5. A vibrator according to claim 4, wherein said vibrating member, said supporting portions and said first connecting portions are made of a permanent elastic material selected from the group consisting of iron-nickel alloy and elinvar and wherein said holding member is a chromium-iron alloy.

* * * * *